(12) United States Patent
Kobayashi

(10) Patent No.: US 7,386,273 B2
(45) Date of Patent: Jun. 10, 2008

(54) RECEIVING APPARATUS

(75) Inventor: Satoshi Kobayashi, Tokyo (JP)

(73) Assignee: Sony Corporation (JP)

( * ) Notice: Subject to any disclaimer, the term of this patent is extended or adjusted under 35 U.S.C. 154(b) by 904 days.

(21) Appl. No.: 10/870,306

(22) Filed: Jun. 17, 2004

(65) Prior Publication Data

US 2005/0020202 A1   Jan. 27, 2005

(30) Foreign Application Priority Data

Jun. 20, 2003   (JP) ............................ P2003-176664

(51) Int. Cl.
*H04Q 7/20* (2006.01)
*H04Q 7/32* (2006.01)

(52) U.S. Cl. .................. 455/3.06; 455/3.01; 455/3.02; 455/3.04; 455/403; 455/422.1; 455/414.1; 455/414.3; 725/86; 725/87; 725/91; 725/100; 725/105; 725/106; 725/118; 709/201; 709/202; 709/203

(58) Field of Classification Search ............... 455/3.06, 455/3.01, 3.02, 3.04, 403, 414.1, 414.3, 414.4, 455/418, 419, 420, 422.1, 426.1, 426.2, 500, 455/517; 725/105, 38, 106, 86, 87, 91, 100, 725/120, 114, 112, 116–118, 131, 143, 151; 709/201–203

See application file for complete search history.

(56) References Cited

U.S. PATENT DOCUMENTS

| | | | | |
|---|---|---|---|---|
| 6,728,763 | B1 * | 4/2004 | Chen .......................... | 709/219 |
| 6,876,835 | B1 * | 4/2005 | Marko et al. .............. | 455/3.06 |
| 6,975,836 | B2 * | 12/2005 | Tashiro et al. ............. | 455/3.01 |
| 2003/0161609 | A1 * | 8/2003 | Hamada et al. ............... | 386/46 |

\* cited by examiner

*Primary Examiner*—Keith Ferguson
(74) *Attorney, Agent, or Firm*—Lerner, David, Littenberg, Krumholz & Mentlik, LLP

(57) ABSTRACT

A decision portion decides whether a tuner can receive real-time broadcast content delivered from a server apparatus. If the real-time broadcast content can be received, a control portion controls the tuner so that it may receive the delivered real-time broadcast content. Further, a signal selection portion selects the broadcast content received by the tuner in place of the broadcast content delivered from the server apparatus. A presentation processing portion performs presentation processing on the broadcast content selected by the signal selection portion. It is thus possible to present, with a good quality, the real-time broadcast content delivered by the server apparatus even if an amount of traffic over a network increases.

15 Claims, 5 Drawing Sheets

FIG. 1
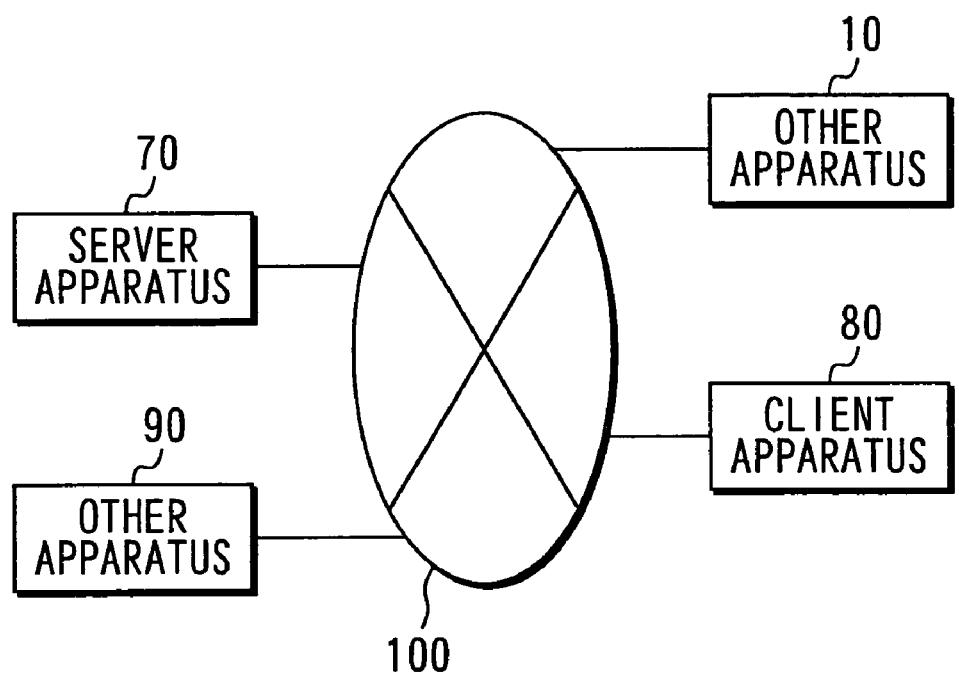
FIG. 2A
FIG. 2B

FIG. 5A
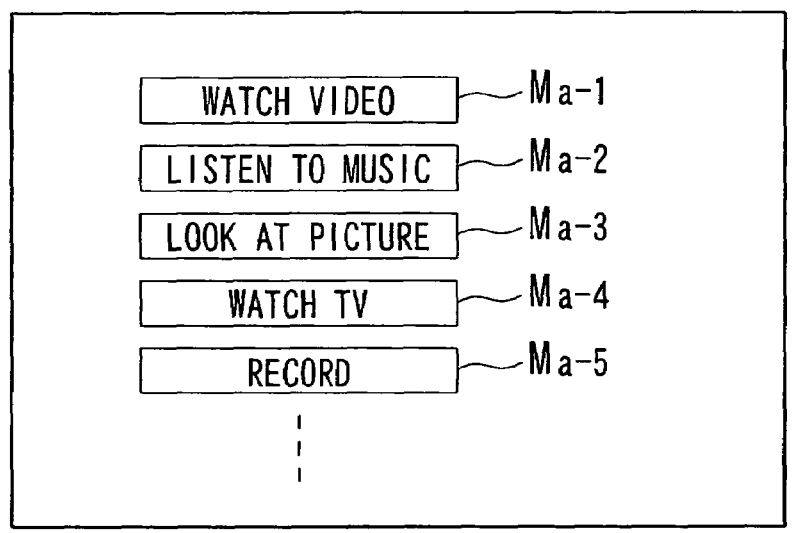
FIG. 5B
| TITLE | GENRE | PERFORMER | REPRODUCTION TIME |
|---|---|---|---|
| 123abc | DRAMA | MR. SO-AND-SO | 1:50 |
| BASEBALL ZZ | SPORTS | | 2:30 |
| MZ | MUSIC | MS. SUCH-AND-SUCH | 0:55 |
FIG. 5C
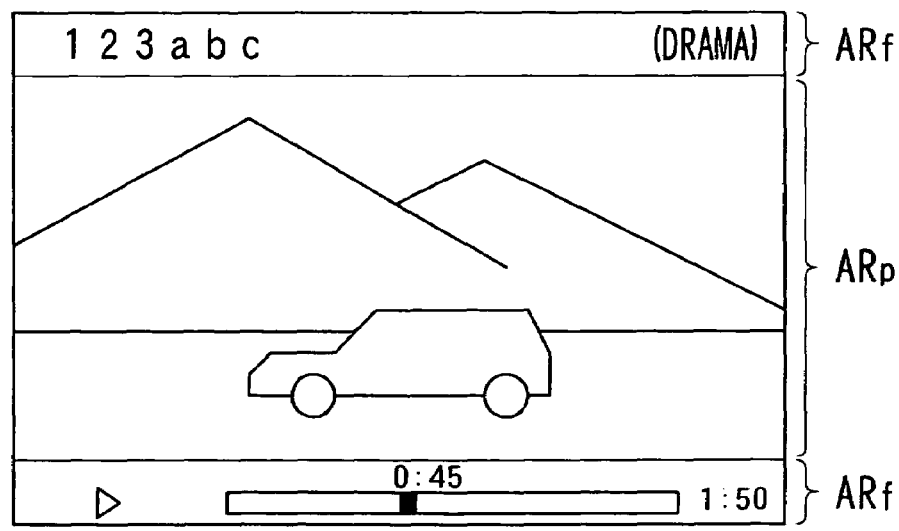

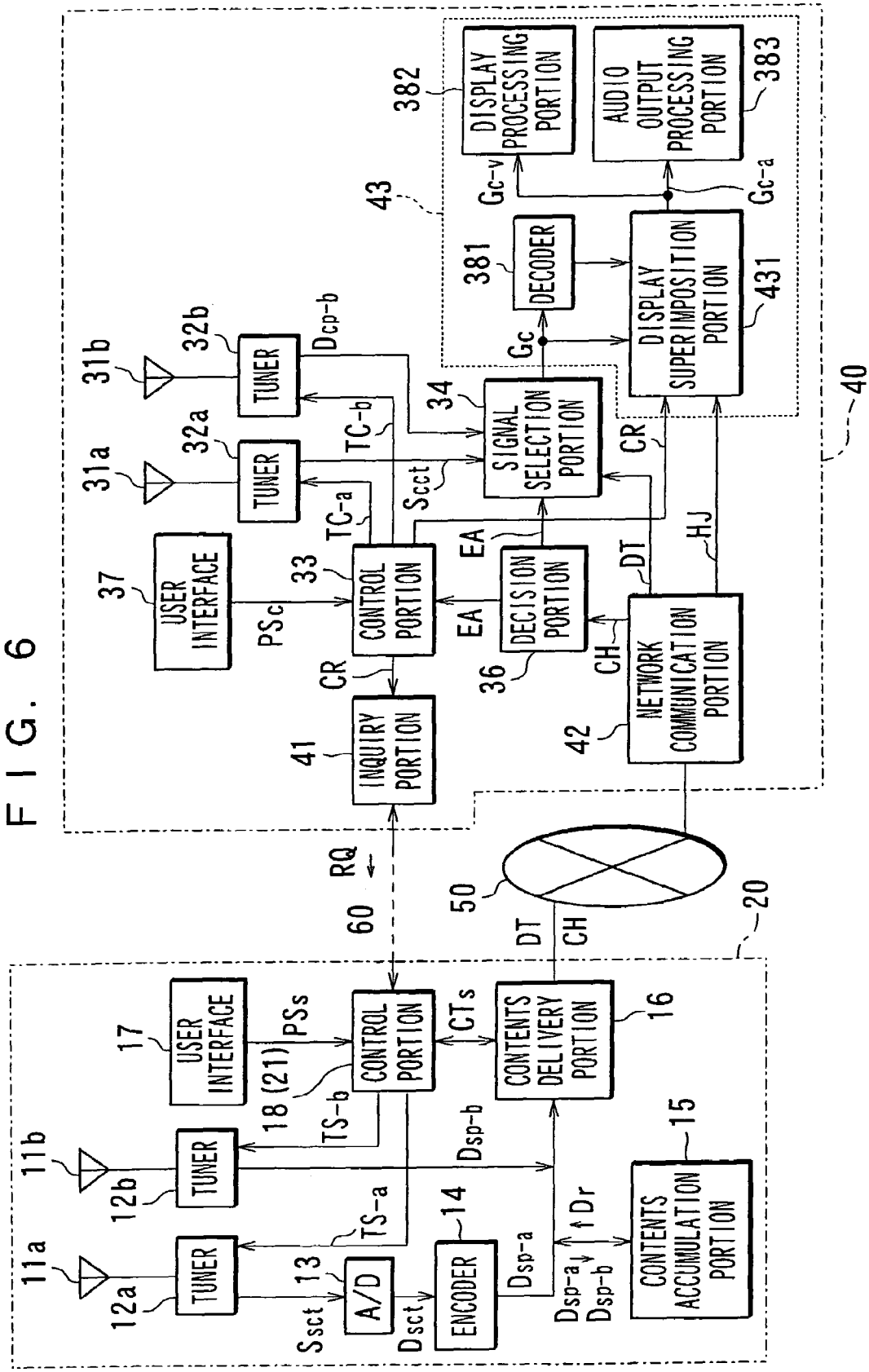

RECEIVING APPARATUS

CROSS-REFERENCE TO RELATED APPLICATIONS

The present application claims priority from Japanese Application No. 2003-176664, filed Jun. 20, 2003, the disclosure of which is hereby incorporated by reference herein.

BACKGROUND OF THE INVENTION

The present invention relates to a receiving apparatus for receiving content delivered from a content delivery apparatus and presenting the content. More particularly, it relates to a receiving apparatus, etc. for receiving broadcast content in real time.

With the prevalence of networks in recent years, a transmitter that performs broadcast type communication has delivered image data and/or audio data to a plurality of receiving apparatuses via the Internet.

Further, it has also become common practice to build a network in a home with a server apparatus for accumulating and delivering desired broadcast content, etc. provided therein, thereby delivering the content from the server apparatus to a client apparatus through the network.

However, when broadcast content, etc. are delivered in a home, it may occur that not only the broadcast content, etc. accumulated at a server apparatus, but also the broadcast content received by the server apparatus, are delivered to a client apparatus in real time. For example, when the broadcast content to be accumulated at the server apparatus are monitored on the client apparatus, the server apparatus is required to deliver the received content to the client apparatus in real time.

There is too large an amount of traffic over a network to keep a good communication speed between the server apparatus and the client apparatus, thereby causing delayed transmission. This prevents the server apparatus from delivering all of the information of the broadcast content received thereby to the client apparatus in real time. As a result, the quality of the broadcast content obtained by the client apparatus is less than that of the broadcast content received by the server apparatus.

For example, in the content delivery system shown in FIG. 1, image data of broadcast content received by a server apparatus 70 is encoded and delivered via a network 100 to a client apparatus 80. In this system, if there is not so large an amount of traffic over the network 100, all of the information is delivered and an image having a good quality, such as shown in FIG. 2A, is presented at the client apparatus 80. However, if another apparatus 90 connected to the network 100 performs a communication so that the amount of traffic over the network 100 increases, this causes the communication speed between the server apparatus 70 and the client apparatus 80 to deteriorate, for example. Less information is delivered owing to the deterioration in the communication speed. Thus, the quality of the broadcast content obtained at the client apparatus 80 is deteriorated. An image presented at the client apparatus 80 is deteriorated in quality, as shown in FIG. 2B, for example.

In view of the above, it is an object of the present invention to provide a receiving apparatus for receiving broadcast content delivered via a network from a content delivery apparatus and for presenting the broadcast content in real time, without deterioration in the quality of the broadcast content.

SUMMARY OF THE INVENTION

A content-receiving apparatus according to an aspect of the present invention includes a broadcast receiver operable to receive broadcast content; and a communicator operable to receive content delivered via a network. The apparatus also includes a decision device operable to decide whether the broadcast receiver allows the content received by the communicator to be received when the content received by the communicator is real-time broadcast content; a controller operable to control the broadcast receiver to receive the real-time broadcast content when the decision device decides that the broadcast receiver allows the real-time broadcast content to be received; a selector operable to select the broadcast content received by the broadcast receiver in place of the content received by the communicator if the decision device decides that the broadcast receiver allows the real-time broadcast content to be received; and a presentation processor operable to present the broadcast content selected by the selector.

According to the present invention, the communicator receives the real-time broadcast content delivered via the network from a server apparatus which is a content delivery apparatus. Based on broadcast channel information added to the received broadcast content, the decision device decides whether the broadcast receiver allows the real-time broadcast content to be received. Alternatively, an inquiry is made to the server apparatus concerning the broadcast channel information via a network or other transmission channel. Based on a response to this inquiry sent from the server apparatus, the decision device decides whether the broadcast receiver allows the real-time broadcast content received by the communicator to be received. If the broadcast receiver receives the delivered real-time broadcast content in place of the real-time broadcast content delivered by the server apparatus, the broadcast content received by the broadcast receiver is selected and presented.

Therefore, even if an amount of traffic over the network increases, the real-time broadcast content delivered from the content delivery apparatus and received by the broadcast receiver can be presented with a good quality. In the case where an inquiry is made, it is thus possible to properly decide whether the broadcast receiver allows the real-time broadcast content received by the communicator to be received. Further, making the inquiry using a transmission channel different from the network prevents the amount of traffic over the network from increasing.

In the presentation of the broadcast content, an image different from the image of the broadcast content is superimposed on an image of the real-time broadcast content received by the communicator. Even if the broadcast content to be selected is switched from the delivered real-time broadcast content to the broadcast content received by the broadcast receiver, an image different from the image of the broadcast content is superimposed on the image of the broadcast content received by the broadcast receiver.

Therefore, the broadcast content received by the broadcast receiver is presented as if it is real-time broadcast content received by the communicator.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a diagram showing a conventional contents delivery system;

FIGS. 2A and 2B are illustrations each showing an image presented at a client apparatus;

FIGS. 5A-5C are examples of representations each showing menu display and content display; and FIG. 6 is a block diagram showing the configuration of a third embodiment of a broadcast content delivering/receiving system according to the invention.

DETAILED DESCRIPTION

Figure 3:
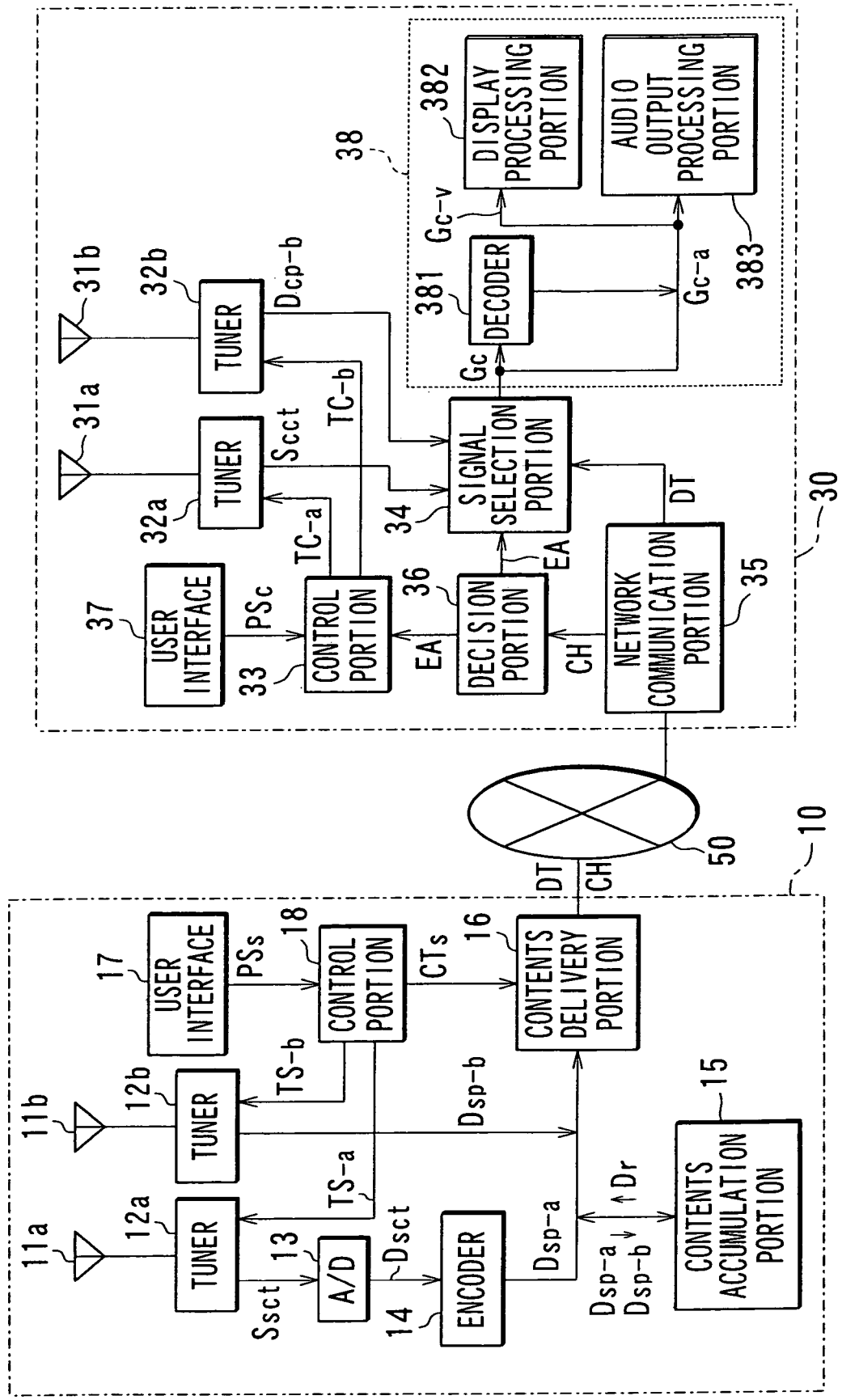
FIG. 3 is a block diagram showing the configuration of a first embodiment of a broadcast content delivering/receiving system according to the invention.

The following will describe embodiments of the present invention with reference to the drawings. FIG. 3 shows the configuration of a first embodiment of a broadcast content delivering/receiving system according to the invention.

A server apparatus 10, which is a content delivery apparatus, has an antenna 11a for receiving an analog broadcast signal and an antenna 11b for receiving a digital broadcast signal. The signal received by the antenna 11a is supplied to a tuner 12a. The signal received by the antenna 11b, on the other hand, is supplied to a tuner 12b.

The tuner 12a selects a desired carrier wave from the signal received by the antenna 11a based on a channel selection control signal TS-a from a control portion 18, which will be described later. Further, it performs detection and demodulation processing on the selected carrier wave and supplies content signal Ssct of the obtained broadcast content, for example, a TV broadcast program or radio broadcast program, to an A/D conversion portion 13.

The tuner 12b selects a desired carrier wave from the signal received by the antenna 11b based on a channel selection control signal TS-b from the control portion 18. Further, it performs detection and demodulation processing on the selected carrier wave, extracts an encoded signal Dsp-b of desired broadcast content from the obtained multiplexed signal, and supplies it to a content accumulation portion 15 and a content delivery portion 16.

The A/D conversion portion 13 converts the content signal Ssct of broadcast content which is supplied from the tuner 12a into a digital content signal Dsct and supplies it to an encoder 14. The encoder 14 encodes the content signal Dsct supplied from the A/D conversion portion 13. By this encoding, a signal of broadcast content, for example, is transformed into an encoded signal that complies with the Motion Picture Experts Group (MPEG) Standards. An encoded signal Dsp-a generated by this encoder 14 is supplied to the content accumulation portion 15 and the content delivery portion 16.

The content accumulation portion 15, which consists of, for example, a hard disk unit, accumulates the encoded signals Dsp-a and Dsp-b supplied from the tuner 12b and the encoder 14, respectively. Further, it reads a signal accumulated in it in response to a request from the control portion 18 and supplies the signal as a read signal Dr to the content delivery portion 16. Note that the content accumulation portion 15 may accumulate not only the encoded signal of broadcast content, but also signals of moving picture content, music content, and still picture content.

The content delivery portion 16 has a unicast function to deliver content to a specified client apparatus connected to a network 50, a multicast function to deliver content at the same time to a plurality of client apparatuses connected to the network 50, and a broadcast function to deliver content at the same time to all of the client apparatuses connected to the network 50. This content delivery portion 16 delivers content by transmitting, as a content delivery signal DT, the encoded signal Dsp-b supplied from the tuner 12b, the encoded signal Dsp-a supplied from the encoder 14, and the read signal Dr read from the content accumulation portion 15 to the client apparatus using a predetermined communication protocol. As the communication protocol, a connectionless type protocol UDP (User Datagram Protocol) is used to transmit the content delivery signal DT to the client apparatus in a packet by unicasting, multicasting, or broadcasting. Note that the communication protocol used is not limited to UDP, but may be any other protocol.

A user interface 17 generates an operation signal PSs in accordance with an operation of a manager of the server apparatus 10 and supplies it to the control portion 18. This user interface 17, which is consists of a remote-control signal receiver, an operation switch, etc., generates the operation signal PSs in accordance with a signal transmitted from a remote controller or a switching operation.

The control portion 18 generates a control signal CTs based on the operation signal PSs supplied from the user interface 17 and uses this control signal CTs to control reading/writing of a signal to the content accumulation portion 15, sending, etc. of the content delivery signal from the content delivery portion 16 to the client apparatus, etc. The control portion 18 also generates the channel selection control signals TS-a and TS-b to control the operation of channel selections in the tuners 12a and 12b, respectively. Furthermore, when delivering the broadcast content received by the tuner 12a or 12b from the content delivery portion 16 in real time, it adds to the content delivery signal DT the broadcast channel information CH to indicate which channels of any broadcast waves were used to broadcast the broadcast content.

The client apparatus 30, which is a receiving apparatus, has an antenna 31a for receiving an analog broadcast signal and an antenna 31b for receiving a digital broadcast signal. The signal received by the antenna 31a is supplied to a tuner 32a. The signal received by the antenna 31b, on the other hand, is supplied to a tuner 32b. Note that the antennas 31a and 31b and the tuners 32a and 32b are combined to constitute a broadcast receiver.

Based on a channel selection control signal TC-a from a control portion 33, the tuner 32a selects a desired carrier wave from the signal received by the antenna 31a. Further, it performs detection and demodulation processing on the selected carrier wave and supplies a content signal Scct of broadcast content obtained therefrom to a signal selection portion 34.

Based on a channel selection control signal TC-b from the control portion 33, the tuner 32b selects a desired carrier wave from the signal received by the antenna 31b. Further, it performs detection and demodulation processing on the selected carrier wave, extracts an encoded signal Dcp-b of desired broadcast content from a multiplexed signal obtained therefrom, and supplies it to the signal selection portion 34.

A network communication portion 35 communicates with other apparatuses via the network 50. In the present embodiment, it communicates with the server apparatus 10 to receive the content delivery signal DT of content delivered from the server apparatus 10 and supplies it to the signal selection portion 34. Further, when supplied with an encoded signal of real-time broadcast content as the content delivery signal DT and also with the broadcast channel information CH concerning the broadcast content added to the content delivery signal DT, it supplies this broadcast channel information CH to a decision portion 36.

The decision portion 36 decides, based on the broadcast channel information CH, whether the tuner 32a or 32b can receive real-time broadcast content received by the network communication portion 35 and supplies a decision signal EA to the control portion 33 and the signal selection portion 34.

If the decision signal EA indicates that the tuner 32a or 32b can receive the real-time broadcast content, the control portion 33 supplies the channel selection control signal TC-a or TC-b to the tuner 32a or 32b, respectively, in order to receive the broadcast content. Note that a user interface 37, which has almost the same configuration as that of the above-mentioned user interface 17, is connected to the control portion 33. Thus, the control portion 33 also controls channel selection operations by the tuner 32a and 32b based on the operation signal PSc from the user interface 37.

The signal selection portion 34 selects one of the content delivery signal DT received by the network communication portion 35, the content signal Scct supplied from the tuner 32a, or the encoded signal Dcp-b supplied from the tuner 32b and supplies it as a selected content signal Gc to a presentation processing portion 38.

If the selected content signal Gc is not an encoded signal, the presentation processing portion 38 supplies a display processing portion 382 and an audio output processing portion 383, respectively, with a signal Gc-v that indicates an image of the supplied content and a signal Gc-a that indicates audio of the supplied content. If the selected content signal Gc is an encoded signal, on the other hand, it decodes this selected content signal Gc using a decoder 381 and then supplies the display processing portion 382 and the audio output processing portion 383, respectively, with the signal Gc-v that indicates the image of the content and the signal Gc-a that indicates the audio of the content.

The display processing portion 382 performs adjustment, etc. of a luminance level and a color of the supplied signal Gc-v and outputs it as an image output signal in a predetermined format. Further, if a display device such as a cathode-ray tube or a liquid crystal display is provided, it generates a drive signal therefor to drive the display device, thereby displaying an image of the broadcast content. Note that the display processing portion 382 also performs processing for converting the supplied signal Gc-v into a digital or analog signal as occasion demands.

The audio output processing portion 383 performs adjustment, etc. of a signal level of the supplied signal Gc-a and outputs it as an audio output signal. Further, if a speaker is provided, it drives the speaker based on the audio output signal to output audio of the broadcast content. Note that if the supplied signal Gc-a is a digital signal, it also performs processing for converting it into an analog signal.

The following will describe the operation of the content delivery system according to the invention.

When delivering in real time the broadcast content received by any tuners, the server apparatus 10 adds broadcast channel information CH indicating which channel is broadcasting the broadcast content being delivered as the content delivery signal, to an encoded signal of the delivered broadcast content.

The client apparatus 30 decides whether the broadcast channel information CH is contained in the content delivery signal DT received by the network communication portion 35. If the broadcast channel information CH is contained in the received signal, the client apparatus 30 extracts this broadcast channel information CH. The extracted broadcast channel information CH is then supplied to the decision portion 36.

The decision portion 36 decides, based on the supplied broadcast channel information CH, whether the tuner 32a or 32b can receive the real-time broadcast content received by the network communication portion 35 and sends the decision signal EA to the control portion 33 and the signal selection portion 34. If it is decided that the tuner 32a or 32b can receive them, the control portion 33 supplies the tuner 32a or 32b with the channel selection control signal TC-a or TC-b, respectively, so that it may receive the real-time broadcast content delivered from the server apparatus 10.

Further, the signal selection portion 34 selects the content signal Scct received by the tuner 32a or the encoded signal Dcp-b received by the tuner 32b in place of the content delivery signal DT received by the network communication portion 35 and supplies it to the presentation processing portion 38, thereby presenting the broadcast content received by the tuner 32a or 32b, which are the same as the broadcast content delivered from the server apparatus 10.

In such a manner, if the client apparatus can receive the real-time broadcast content delivered from the server apparatus, the broadcast content received by the client apparatus is presented so that broadcast content having a good quality can be presented regardless of the amount of traffic over the network.

Although the content delivered from the server apparatus 10 is presented at the client apparatus 30 in the above embodiment, selecting the content to be presented by a user of the client apparatus 30 allows its operation to be improved further.

The following will describe a second embodiment with reference to a case where content to be presented can be selected by the user of the client apparatus.

Figure 4:
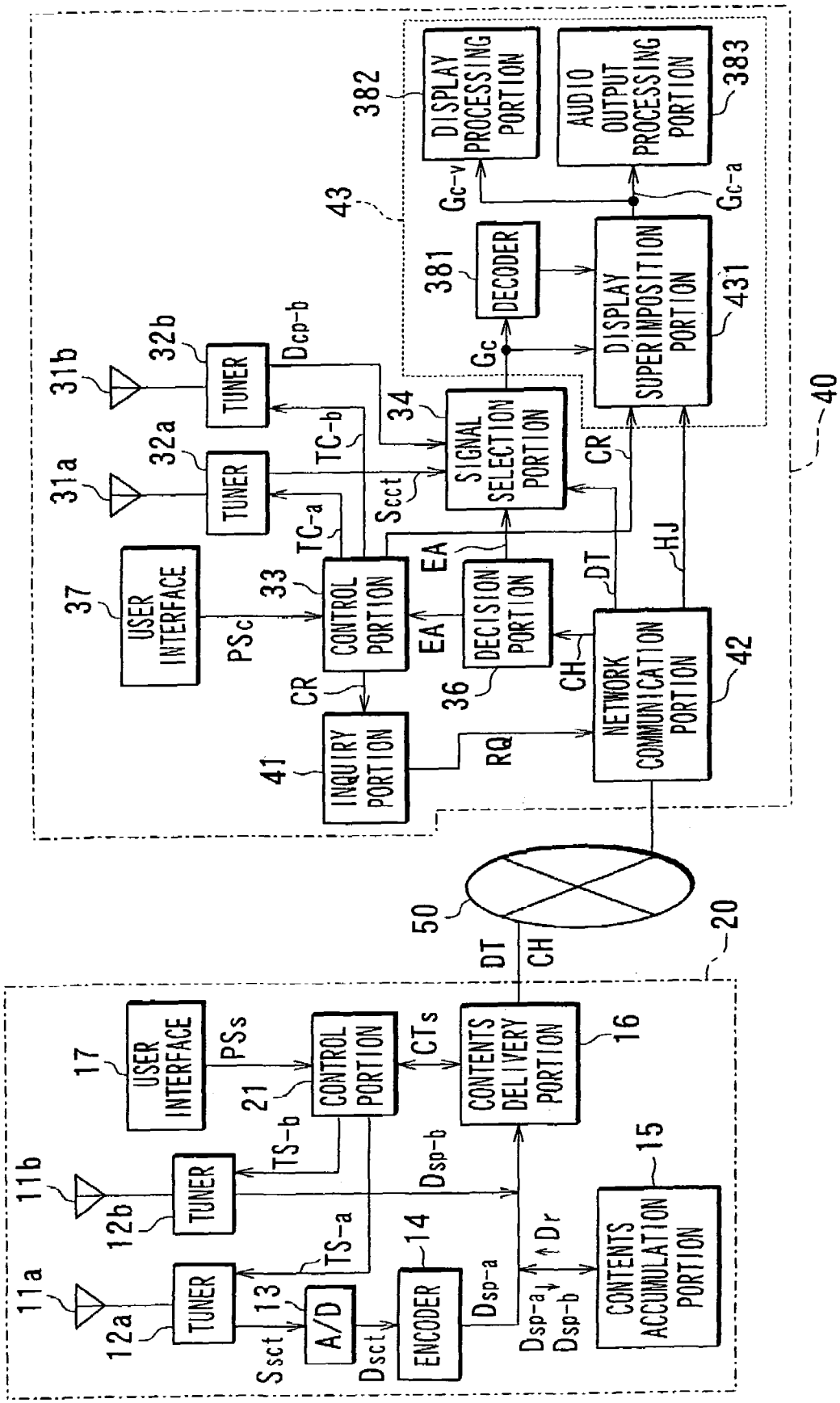
FIG. 4 is a block diagram showing the configuration of a second embodiment of a broadcast content delivering/receiving system according to the invention.

FIG. 4 shows a second embodiment of a broadcast content delivering/receiving system according to the invention. Note that elements in FIG. 4 that correspond to those in FIG. 3 are indicated by the same symbols and detailed description thereof is omitted.

A control portion 21 in a server apparatus 20 generates a response to an inquiry supplied from an inquiry portion 41 in a client apparatus 40, which will be described later, and supplies the response to the client apparatus 40 via a content delivery portion 16.

A control portion 33 in the client apparatus 40 generates a control signal CR based on an operation signal PSc from a user interface 37 and supplies this control signal CR to the inquiry portion 41 and a display superimposition portion 431 which is arranged in a presentation processing portion 43, thereby controlling operation of the inquiry portion 41 and the display superimposition portion 431.

The inquiry portion 41 supplies a variety of inquiries RQ to the server apparatus 20 via a network communication portion 42 based on the control signal CR supplied from the control portion 33.

The network communication portion 42, like the network communication portion 35, communicates with the server apparatus 20, receives a content delivery signal DT from the server apparatus 20, and supplies it to a signal selection portion 34. Further, if any broadcast channel information CH is added to the received content, the network communication portion 42 supplies this broadcast channel information to a decision portion 36. Further, it supplies the inquiry RQ to the server apparatus 20 using, for example, a connection type protocol TCP (Transmission Control Protocol). Further, if supplied from the server apparatus 20 with display information HJ to be displayed on a content display screen, it supplies this display information HJ to the display superimposition portion 431 in the presentation processing portion 43.

The display superimposition portion 431 is adapted to give, together with an image of the content, a menu display or such other display based on the display information supplied from the server apparatus 20. The display superimposition portion 431 generates a display superimposition signal based on the control signal CR from the control portion 33 or the display information HJ supplied from the network communication portion 42. This display superimposition signal is superimposed on a signal Gc-v of an image supplied from the signal selection portion 34 or a decoder 381. The superimposed signals are supplied to a display processing portion 382.

The following will describe the operation of the second embodiment of the broadcast content delivering/receiving system according to the invention.

When the control portion 33 in the client apparatus 40 decides that a menu has been displayed by the operation signal PSc from the user interface 37, it controls the display superimposition portion 431 so that it may superimpose a display superimposition signal in the displayed menu on the signal Gc-v.

FIGS. 5A to 5C show examples of the menu displays. As menu display items, such display items are provided as to enable selected content to be delivered from the server apparatus 20 or to be accumulated at the server apparatus 20. For example, as shown in FIG. 5A, the menu is provided with an item Ma-1 for delivering moving-picture content accumulated at the server apparatus 20, an item Ma-2 for delivering music content, an item Ma-3 for delivering still picture content, an item Ma-4 for delivering broadcast content, and an item Ma-5 for accumulating broadcast content.

In this configuration, if the control portion 33 receives an operating signal for selecting, for example, the item Ma-1 for delivering the moving picture content, the inquiry portion 41 makes an inquiry to the server apparatus 20 concerning information that indicates what kinds of moving picture content are accumulated at the content accumulation portion 15, based on the control signal from the control portion 33.

The control portion 21 in the server apparatus 20 responds to the inquiry from the inquiry portion 41. Note that when having received a request for the information about what kinds of moving picture content are accumulated at the content accumulation portion 15, the control portion 21 responds to it by giving, as the display information, such information as to enable details of the accumulated moving picture content, for example, a title, a genre, a performer, and a reproduction time, to be determined.

The network communication portion 42 supplies the display information HJ provided from the server apparatus 20 to the display superimposition portion 431. The display superimposition portion 431 generates the display superimposition signal based on the supplied display information HJ and superimposes it on the signal Gc-v supplied from the signal selection portion 34 or the decoder 381. In this case, as shown in, for example, FIG. 5B, a list of the accumulated moving picture content is displayed. Then, when any one of the moving picture contents is selected from the displayed list, the inquiry portion 41 makes a request to the server apparatus 20 for delivery of the selected moving picture content, whereupon the server apparatus 20 reads the requested moving picture content from the client apparatus 40 and delivers it.

The signal selection portion 34 in the client apparatus 40 selects a signal of moving picture content supplied from the server apparatus 20 and supplies it to the presentation processing portion 43. The presentation processing portion 43 then decodes the signal of the moving picture content using the decoder 381 and supplies it via the display superimposition portion 431 to the display processing portion 382 and the audio output processing portion 383. Note that generating the display superimposition signal for displaying information about the delivered moving picture content at the display superimposition portion 431 and superimposing it on the signal Gc-v allows an image of the moving picture content to be displayed in a content image display region ARp, as shown in FIG. 5C, and also allows information, such as a title, a genre, and a reproduction position of the selected moving picture content, to be displayed in an information display region ARf.

If the item Ma-4 for delivering the broadcast content or the item Ma-5 for accumulating the broadcast content is selected, a menu for selecting a channel or setting the broadcast content to be recorded is displayed. If, based on this menu display, an operation is performed for selecting a channel or setting the broadcast content to be recorded, an inquiry RQ is supplied to the server apparatus 20 based on the operating signal PSc.

The server apparatus 20 receives the broadcast content of the channel in accordance with the inquiry RQ and delivers the received real-time broadcast content to the client apparatus 40. Further, it receives the broadcast content to be recorded and accumulates it at the content accumulation portion 15 and also delivers the broadcast content to the client apparatus 40 in real time so that the broadcast content accumulated can be confirmed.

When the broadcast content of the selected channel or the broadcast content which has been set to be recorded is delivered in real time, the decision portion 36 in the client apparatus 40 decides whether the tuner 32a or 32b in the client apparatus 40 can receive the broadcast content. If such is the case, it presents the broadcast content received by the tuner 32a or 32b in place of the broadcast content delivered from the server apparatus 20 as described above.

Further, the presentation processing portion 43 equally presents the real-time broadcast content delivered from the server apparatus 20 and received by the network communication portion 42 and the substitutive broadcast content received by the tuner 32a or 32b in place of the broadcast content delivered from the server apparatus 20. For example, a moving picture of the real-time broadcast content received by the network communication portion 42 and displayed in the content image display region ARp of FIG. 5C is replaced by a moving picture of the broadcast content received by the tuner 32a or 32b in the display region ARp. By thus presenting such content equally, it is possible not only to present the broadcast content with a good quality irrespective of an amount of traffic over the network, but also to present the broadcast content received by the tuner 32a or 32b as if they are broadcast content delivered from the server apparatus 20 and received by the network communication portion 42.

Further, even if an operation of presenting the broadcast content received by the tuner 32a or 32b is avoided by individually controlling a channel selection operation by the tuner 32a and 32b and a signal selection operation by the signal selection portion 34 in order to display real-time broadcast content with a high quality, the received broadcast content can be presented by an operation of delivering real-time broadcast content from the server apparatus, thereby improving its operation.

Furthermore, if no broadcast channel information CH has been added to the content delivery signal DT received by the network communication portion 42, the inquiry portion 41 supplies an inquiry RQ concerning the broadcast channel information CH via the network 50. In response to this inquiry RQ, the control portion 21 in the server apparatus 20 adds the broadcast channel information CH to the content delivery signal. By thus enabling an inquiry concerning the broadcast channel information CH, the client apparatus 40 can properly decide whether the tuner 32a or 32b can receive the real-time broadcast content delivered from the server apparatus 20 and received by the network communication portion 42.

The inquiry and response transferred between the server apparatus 20 and the client apparatus 40 are not limited to the case where a network 50 is used. For example, if a transmission channel 60 different from the network 50 is used, as shown in FIG. 6, this keeps the amount of traffic over the network 50 from increasing due to an inquiry or response. As this transmission channel 60, a transmission channel can be used that enables connection of the server apparatus 20 and the client apparatus 40 to each other in a one-to-one relationship, for example, a bus in accordance with the bi-directional infrared communication standards or the RS-232C standards. Further, another network may be used to connect the server apparatus and the client apparatus to each other. Furthermore, a serial bus standardized to interconnect a plurality of electronic appliances can be used, for example, an IEEE1394 serial bus or a universal serial bus (USB).

Although, in the above embodiments, it has been supposed to use an encoded signal in the delivery of content, the content signal may be delivered without being encoded if there is an extra amount of traffic over the network. In this case, the encoder and the decoder can be omitted from the configuration. Further, the arrangement of the tuners in the server apparatuses 10 and 20 and the client apparatuses 30 and 40 and the protocol for communication between the server 10 or 20 and the client apparatus 30 or 40, respectively, are illustrative and not limited to those given in the above embodiments. Furthermore, not only where the server apparatus and the client apparatus are connected to each other, but also where a content delivery apparatus for sending only received real-time broadcast content to other appliances and a receiving apparatus having a function to receive the content sent by this apparatus and a tuner function are connected to each other, they can be operated as described above to well present the real-time broadcast content thus sent.

Further, according to the invention, an inquiry device is provided for making an inquiry concerning broadcast channel information for the real-time broadcast content to a content delivery apparatus. Based on a response to the inquiry, which is supplied from the content delivery apparatus, the decision device decides whether the broadcast receiver can receive the content. It is thus possible to properly decide whether the broadcast receiver can receive the real-time broadcast content received by the communicator. Further, making an inquiry from the inquiry device using a transmission channel different from the network prevents the quantity of traffic over the network from increasing.

Furthermore, according to the invention, a displaying-and-superimposing device is provided for superimposing on an image of the content an image different therefrom. On real-time broadcast content received by the communicator, an image different from an image of the broadcast content is superimposed. Even if the broadcast content to be selected by the selector is switched from the real-time broadcast content received by the communicator to broadcast content received by the broadcast receiver, an image different from the image of the broadcast content is superimposed on an image of the broadcast content received by the broadcast receiver. Therefore, the broadcast content received by the broadcast receiver can be presented as if they are the real-time broadcast content received by the communicator.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A content-receiving apparatus, comprising:
 a broadcast receiver operable to receive broadcast content;
 a communicator operable to receive content delivered via a network;
 a decision device operable to decide whether the broadcast receiver allows the content received by the communicator to be received when the content received by the communicator is real-time broadcast content;
 a controller operable to control the broadcast receiver to receive the real-time broadcast content when the decision device decides that the broadcast receiver allows the real-time broadcast content to be received;
 a selector operable to select the broadcast content received by the broadcast receiver in place of the content received by the communicator if the decision device decides that the broadcast receiver allows the real-time broadcast content to be received; and
 a presentation processor operable to present the broadcast content selected by the selector.

2. The content-receiving apparatus according to claim 1, wherein the decision device decides whether the broadcast receiver allows the real-time broadcast content received by the communicator to be received based on broadcast channel information for the broadcast content, the broadcast channel information being added to the real-time broadcast content.

3. The content-receiving apparatus according to claim 1, further comprising:
 an inquiry device operable to make an inquiry to a content delivery apparatus concerning broadcast channel information for the real-time broadcast content received by the communicator,
 wherein the decision device decides whether the broadcast receiver allows the real-time broadcast content to be received based on a response to the inquiry supplied from the content delivery apparatus.

4. The content-receiving apparatus according to claim 3, wherein the inquiry device supplies the inquiry via the communicator.

5. The content-receiving apparatus according to claim 3, wherein the inquiry device supplies the inquiry using a transmission channel different from the network.

6. The content-receiving apparatus according to claim 1, further comprising:
a displaying-and-superimposing device operable to superimpose for display on an image of the broadcast content an image different from the image of the broadcast content,
wherein the displaying-and-superimposing device superimposes a first image for display on a second image, the second image being an image of the real-time broadcast content received by the communicator, the first image being an image different from the second image, and the displaying-and-superimposing device superimposes the first image for display on a third image, the third image being an image of the broadcast content received by the broadcast receiver, even if the selector switches from the real-time broadcast content received by the communicator to the broadcast content received by the broadcast receiver.

7. A content-receiving method, comprising:
receiving content via a network;
if the content received via the network is real-time broadcast content, deciding whether a broadcast receiver for receiving the broadcast content broadcast in real-time allows the real-time broadcast content to be received;
controlling the broadcast receiver to receive the real-time broadcast content if it is decided that the broadcast receiver allows the real-time broadcast content to be received;
selecting the real-time broadcast content received by the broadcast receiver in place of the content received via the network if it is decided that the broadcast receiver allows the real-time broadcast content to be received; and
presenting the selected broadcast content.

8. The content-receiving method according to claim 7, wherein the decision of whether the broadcast receiver allows the real-time broadcast content to be received is based on broadcast channel information for the broadcast content, the broadcast channel information being added to the real-time broadcast content received via the network.

9. The content-receiving method according to claim 7, further comprising:
making an inquiry to a content delivery apparatus concerning broadcast channel information for the real-time broadcast content received via the network; and
deciding whether the broadcast receiver allows the real-time broadcast content to be received based on a response to the inquiry supplied from the content delivery apparatus.

10. The content-receiving method according to claim 9, wherein the inquiry is supplied via the network.

11. The content-receiving method according to claim 9, wherein the inquiry is supplied via a transmission channel different from the network.

12. The content-receiving method according to claim 7, further comprising:
superimposing for display on an image of the broadcast content an image different from the image of the broadcast content, wherein
a first image is superimposed for display on a second image, the second image being an image of the real-time broadcast content received via the network, the first image being an image different from the second image, and
the first image is superimposed for display on a third image, the third image being an image of the broadcast content received by the broadcast receiver, even if the selecting step switches from the real-time broadcast content received via the network to the broadcast content received by the broadcast receiver.

13. A content delivery apparatus, comprising:
a receiver operable to receive broadcast content broadcast in real time;
a delivery device operable to deliver content via a network;
a decision device operable to decide whether content requested by a content-receiving apparatus is real-time broadcast content; and
an adding device operable to add channel information of the broadcast content to the content requested by the content-receiving apparatus if the decision device decides that the content requested by the content-receiving apparatus is the real-time broadcast content.

14. A content delivery method, comprising:
receiving broadcast content broadcast in real time;
deciding whether content requested by a content-receiving apparatus is real-time broadcast content;
adding channel information of the broadcast content to the content requested by the content-receiving apparatus if the deciding step decides that the content requested by the content-receiving apparatus is the real-time broadcast content; and
delivering the broadcast content to which the channel information has been added via a network.

15. A broadcast content delivering/receiving system, comprising:
a content delivery apparatus; and
a content-receiving apparatus;
the content delivery apparatus including:
a receiver operable to receive broadcast content broadcast in real time;
a delivery device operable to deliver content via a network;
a decision device operable to decide whether content requested by the content-receiving apparatus is real-time broadcast content; and
an adding device operable to add channel information for the broadcast content to the content requested by the content-receiving apparatus if the decision device decides that the content requested by the content-receiving apparatus is the real-time broadcast content, and
the content-receiving apparatus including:
a broadcast receiver operable to receive the broadcast content;
a communicator operable to receive content delivered via the network;
a decision device operable to decide whether the broadcast receiver allows the content received by the communicator to be received when the content received by the communicator is real-time broadcast content;
a controller operable to control the broadcast receiver to receive the real-time broadcast content when the decision device decides that the broadcast receiver allows the real-time broadcast content to be received;
a selector operable to select the broadcast content received by the broadcast receiver in place of the content received by the communicator if the decision device decides that the broadcast receiver allows the real-time broadcast content to be received; and
a presentation processor operable to present the broadcast content selected by the selector.

* * * * *